(12) United States Patent
Ingratta et al.

(10) Patent No.: US 10,781,301 B2
(45) Date of Patent: Sep. 22, 2020

(54) POLYMER COMPOSITIONS HAVING A HALO-CONTAINING POLYMER WITH A MULTI-FUNCTIONAL PHOSPHINE LINKAGE

(71) Applicant: ARLANXEO Singapore Pte. Ltd., Singapore (SG)

(72) Inventors: Mark Ingratta, Copley, OH (US); Sharon Guo, London (CA); Phil Magill, London (CA); Gregory J. E. Davidson, London (CA)

(73) Assignee: ARLANXEO Singapore Pte. Ltd., Singapore (SG)

( * ) Notice: Subject to any disclaimer, the term of this patent is extended or adjusted under 35 U.S.C. 154(b) by 152 days.

(21) Appl. No.: 16/093,704

(22) PCT Filed: Apr. 7, 2017

(86) PCT No.: PCT/CA2017/050425
§ 371 (c)(1),
(2) Date: Oct. 15, 2018

(87) PCT Pub. No.: WO2017/177314
PCT Pub. Date: Oct. 19, 2017

(65) Prior Publication Data
US 2019/0136020 A1   May 9, 2019

(30) Foreign Application Priority Data

Apr. 15, 2016 (EP) .................................. 16165563

(51) Int. Cl.
*C08L 15/02* (2006.01)
*C08C 19/24* (2006.01)
*C08F 8/40* (2006.01)
*C08F 10/10* (2006.01)

(52) U.S. Cl.
CPC .............. *C08L 15/02* (2013.01); *C08C 19/24* (2013.01); *C08F 8/40* (2013.01); *C08F 10/10* (2013.01)

(58) Field of Classification Search
CPC ......... C08L 15/02; C08C 19/24; C08C 19/14; C08C 19/22; C08C 19/28
See application file for complete search history.

(56) References Cited

U.S. PATENT DOCUMENTS

2009/0299000 A1* 12/2009 Resendes ................. C08K 5/14
524/576

\* cited by examiner

*Primary Examiner* — Robert D Harlan
(74) *Attorney, Agent, or Firm* — The Dobrusin Law Firm, P.C.

(57) ABSTRACT

A polymer composition is provided with a multi-modal molecular weight distribution of a halo-containing polymer. The halo-containing polymer is has multi-functional phosphine linkages at less than 10% of halo sites of the halo-containing polymer that were available before multi-functional phosphine linking. A process for producing a polymer composition having a multi-modal molecular weight distribution involves dispersing a multi-functional phosphine compound in a halo-containing polymer, the halo-containing polymer comprising a total number of available halo sites, and reacting the multi-functional phosphine compound with the halo-containing polymer at an elevated temperature to produce the polymer composition in which less than 10% of the total number of available halo sites are reacted with the phosphine compound to provide multi-functional phosphine linkages in the halo-containing compound.

19 Claims, 9 Drawing Sheets

POLYMER COMPOSITIONS HAVING A HALO-CONTAINING POLYMER WITH A MULTI-FUNCTIONAL PHOSPHINE LINKAGE

FIELD

The present invention relates to polymer compositions, in particular to polymer compositions comprising a halo-containing polymer with multi-functional phosphine linkages.

BACKGROUND

Poly(isobutylene-co-isoprene) or IIR, is a synthetic elastomer commonly known as butyl rubber (or butyl polymer) which has been prepared since the 1940's through the random cationic copolymerization of isobutylene with small amounts of isoprene. As a result of its molecular structure, IIR possesses superior air impermeability, a high loss modulus, oxidative stability and extended fatigue resistance.

Butyl rubber is understood to be a copolymer of an isoolefin and one or more, optionally conjugated, multiolefins as co-monomers. Commercial butyl comprises a major portion of isoolefin and a minor amount, usually not more than 2.5 mol %, of a conjugated multiolefin. Butyl rubber or butyl polymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Halogenation of this butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company (c) 1987), pp. 297-300. The development of halogenated butyl rubber (halobutyl, or XIIR) has greatly extended the usefulness of butyl by providing much higher curing rates and enabling co-vulcanization with general purpose rubbers such as natural rubber and styrene-butadiene rubber. Butyl rubber and halobutyl rubber are high value polymers, as they possess the unique combination of properties (for example, excellent impermeability, good flex, good weatherability, co-vulcanization with high unsaturation rubbers, in the case of halobutyl). These properties allowed the development of more durable tubeless tires with the air retaining inner liner chemically bonded to the body of the tire.

Given the unique properties associated with butyl rubber, it is important that the green strength of the butyl rubber be sufficient enough to permit processability to form the desired end products prior to curing. Resistance to flow, or increased green strength, in butyl rubber or other polymers typically involves increasing the molecular weight of a polymer. However, increasing the molecular weight of a polymer can have detrimental impacts on processability. Other methods to increase green strength typically involve substantial changes to the polymerization process or production methods. These changes can be costly and time consuming. Considering that resistance to flow is an important property for polymer processability and transport, a simple post polymerization process for increasing polymer green strength is highly desirable.

SUMMARY

In one aspect, there is provided a polymer composition comprising a multi-modal molecular weight distribution of a halo-containing polymer, the halo-containing polymer having multi-functional phosphine linkages at less than 10% of halo sites of the halo-containing polymer that were available before multi-functional phosphine linking.

In another aspect there is provided a process for producing a polymer composition having a multi-modal molecular weight distribution, the process comprising: dispersing a multi-functional phosphine compound in a halo-containing polymer, the halo-containing polymer comprising a total number of available halo sites; and reacting the multi-functional phosphine compound with the halo-containing polymer at an elevated temperature to produce the polymer composition in which less than 10% of the total number of available halo sites are reacted with the phosphine compound to provide multi-functional phosphine linkages in the halo-containing compound.

The polymer composition is considered uncured because the multi-functional phosphine compound only reacts with less than 10% of the available halo sites in the halo-containing polymer. Thus, the halo-containing polymer comprises left over halo sites available for curing. Preferably, about 90% or more of the halo sites of the halo-containing polymer are left over for curing after reacting with the multi-functional phosphine compound. Preferably, the uncured polymer composition comprises a gel content of less than about 10%.

An increase in a high molecular weight fraction of the halo-containing polymer as a result of the multi-functional phosphine linkages is not accompanied by a significant increase in gel content of the polymer composition, which contributes to increased processability and improved green strength along with increased Mooney relaxation times of the polymer composition.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
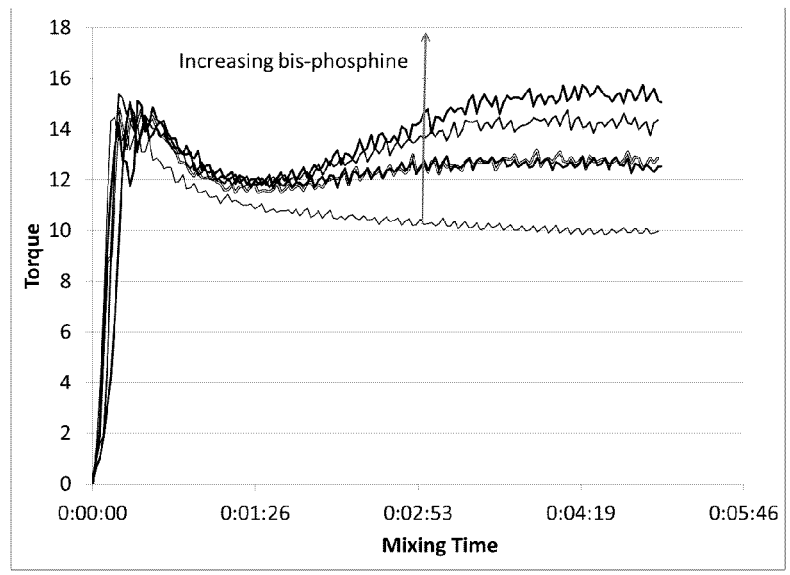
FIG. 1 illustrates torque curves using a small head mixer according to certain embodiments.

The instant disclosure is directed to an uncured polymer composition and methods of producing the same. In certain embodiments, the uncured polymer composition includes a halo-containing polymer having a multi-modal molecular weight distribution with a high molecular weight polymer fraction. The high molecular weight polymer fraction comprises a branched multi-functional phosphine linkage within the polymer structure.

In certain embodiments, the uncured polymer composition is formed from reacting a multi-functional phosphine compound with a halo-containing polymer resulting in an uncured polymer composition having a branched polymer fraction.

According to an aspect of the present disclosure, the halo-containing polymer may include polymers, including copolymers, having at least one isoolefin monomer and one or more multiolefin monomers or one or more styrenic monomers or both.

Suitable isoolefin monomers include hydrocarbon monomers having 4 to 16 carbon atoms. In one embodiment, isoolefins have from 4-7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Multiolefin monomers may include dienes, for example conjugated dienes. Particular examples of multiolefin monomers include those having in the range of from 4-14 carbon atoms. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. A particularly preferred conjugated diene is isoprene.

Styrenic monomers include but are not limited to alkyl-substituted vinyl aromatic monomers, for example $C_1$-$C_4$ alkyl substituted styrene. Specific examples of styrenic monomers include, for example, α-methyl styrene, p-methyl styrene, chlorostyrene, cyclopentadiene and methylcyclopentadiene.

In certain embodiments, the halo-containing polymer includes an ionomer. In certain embodiments, the halo-containing polymers used in the formation of the ionomer comprise at least one allylic halo moiety, or at least one halo alkyl moiety or both. Suitable halo-containing polymers include those polymers having repeating units derived from at least one isoolefin monomer and repeating units derived from one or more multiolefin monomers. In such an embodiment, one or more of the repeating units derived from the multiolefin monomers comprise an allylic halo moiety. In certain embodiments, the halo-containing polymer is obtained by first preparing a polymer from a monomer mixture comprising one or more isoolefins and one or more multiolefins followed by subjecting the resulting polymer to a halogenation process to form the halo-containing polymer. In certain embodiments, the halo-containing polymer may include a halogenated butyl rubber polymer, such as, a bromobutyl rubber polymer and a chlorinated butyl rubber polymer.

Halogenation of a prepared polymer may be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. It is understood that the total allylic halide content of the halo-containing polymer cannot exceed the starting multiolefin content of the parent polymer.

In certain embodiments, butyl rubber copolymer is used as the parent polymer. In such an embodiment, the monomer mixture used in preparing the multiolefin butyl rubber comprises from about 80% to about 99.5% by weight of at least one isoolefin monomer and from about 0.5% to about 20% by weight of at least one multiolefin monomer. In certain embodiments, the monomer mixture comprises from about 83% to about 98% by weight of at least one isoolefin monomer and from about 2.0% to about 17% by weight of a multiolefin monomer.

In certain embodiments, the multiolefin in the butyl polymer comprises at least 0.5 mol % repeating units derived from the multiolefin monomers. In certain embodiments, the repeating units derived from the multiolefin monomers are at least 0.75 mol %. In certain embodiments, the repeating units derived from the multiolefin monomers are at least 1.0 mol %. In certain embodiments, the repeating units derived from the multiolefin monomers are at least 1.5 mol %. In certain embodiments, the repeating units derived from the multiolefin monomers are at least 2.0 mol %. In certain embodiments, the repeating units derived from the multiolefin monomers are at least 2.5 mol %.

In certain embodiments, the multiolefin in the butyl polymer comprises at least 3.0 mol % repeating units derived from the multiolefin monomers. In certain embodiments, the repeating units derived from the multiolefin monomers are at least 4.0 mol %. In certain embodiments, the repeating units derived from the multiolefin monomers are at least 5.0 mol %. In certain embodiments, the repeating units derived from the multiolefin monomers are at least 6.0 mol %. In certain embodiments, the repeating units derived from the multiolefin monomers at least 7.0 mol %.

In certain embodiments, the repeating units derived from the multiolefin monomers are from about 0.5 mol % to about 20 mol %. In certain embodiments, the repeating units derived from the multiolefin monomers are from about 0.5 mol % to about 8 mol %. In certain embodiments, the repeating units derived from the multiolefin monomers are from about 0.5 mol % to about 4 mol %. In certain embodiments, the repeating units derived from the multi-olefin monomers are from about 0.5 mol % to about 2.5 mol %.

In certain embodiments, suitable halobutyl polymers include a brominated butyl rubber formed from isobutylene and less than 2.2 mol % isoprene, which is commercially available from LANXESS Deutschland GmbH and sold under the names Bromobutyl 2030™ Bromobutyl 2040™, Bromobutyl X2™, and Bromobutyl 2230™. In certain embodiments, a suitable halobutyl polymer includes brominated RB 402, also available from LANXESS Deutschland GmbH.

In certain embodiments, the halo-containing polymers for use in the present invention includes a high isoprene brominated butyl rubber formed from isobutylene and at least 3 mol % isoprene or at least 4% mol % isoprene, as described in Canadian Patent Application No. 2,578,583 and 2,418,884, respectively. In certain embodiments, halo-containing polymers may comprise copolymers of at least one isoolefin and one or more alkyl substituted aromatic vinyl monomers. In such an embodiment, one or more of the repeating units derived from the aromatic vinyl monomers comprise a halo alkyl moiety.

In certain embodiments, halo-containing polymers can be obtained by first preparing a copolymer from a monomer mixture comprising one or more isoolefins and one or more styrenic monomers, followed by subjecting the resulting copolymer to a halogenation process to form the halo-containing polymer. During halogenation, some or all of the alkyl groups of the repeating units derived from the aromatic vinyl monomers are halogenated.

In certain embodiments, the halo-containing polymers of the present invention comprise copolymers of at least one isoolefin, one or more multiolefin monomers, and one or more styrenic monomers. In such an embodiment, one or more units derived from the multiolefin monomers comprise an allylic halo moiety and/or one or more units derived from the styrenic monomers comprise a haloalkyl moiety.

In certain embodiments, the monomer mixture used in preparing a polymer of isoolefin, the multiolefin and the styrenic monomers comprise from about 80% to about 99% by weight of isoolefin monomers, from about 0.5% to about 5% by weight the multiolefin monomers, and from about 0.5% to about 15% by weight of the styrenic monomers. In certain embodiments, the monomer mixture comprises from about 85% to about 99% by weight of isoolefin monomer, from about 0.5% to about 5% by weight the multiolefin monomer and from about 0.5% to about 10% by weight styrenic monomer. In some embodiments, the halo-containing polymers have allylic bromide content from 0.05 to 2.0 mol %. In certain embodiments, the allylic bromide content can be from 0.2 to 1.0 mol %. In certain embodiments, the allylic bromide content can be from 0.5 to 0.8 mol %. In certain embodiments, the high multiolefin halo-containing polymers may also contain residual multiolefin levels ranging from 2 to 10 mol %. In some embodiments, the high multiolefin halo-containing polymer may contain residual multiolfefin levels ranging from about 3 to 8 mol %. In other embodiments, the high multiolefin halo-containing polymer may contain residual multiolfefin levels ranging from about 4 to 7.5 mol %.

Halogen-containing polymers that may suitable for use in the instant disclosure include, for example, bromobutyl, chlorobutyl, brominated high isoprene butyl rubber, brominated isobutylene para-methylstyrene (BIMSM), brominated isoprene isobutylene p-methylstyrene terpolymer and starbranch brominated butyl (SBB). In certain embodiments, the halogen-containing polymer is bromobutyl.

According to an aspect of the present disclosure, the halo-containing polymer may be reacted with a multi-functional phosphine compound to produce the polymer composition. The polymer composition includes a polymer fraction having branched multi-functional linkages within the polymer structure and a multi-modal molecular weight distribution. In certain embodiments, the multi-functional phosphine compound may include one or more of a bisphosphine compound, a trisphosphine compound, a tetrakisphosphine compound or any mixture thereof. Bisphosphine compounds are preferred.

Suitable bisphosphine compounds include symmetrical or unsymmetrical bisphosphine nucleophiles of the following structure:

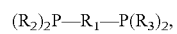

wherein
$R_1$, $R_2$, and $R_3$ are the same or different and are alkyl, alkenyl, cycloalkyl, aryl, heteroaryl, heteroalkyl, heteroalkenyl or heterocycloalkyl. In certain embodiments, the bisphosphine nuclecophiles comprise the following structure:

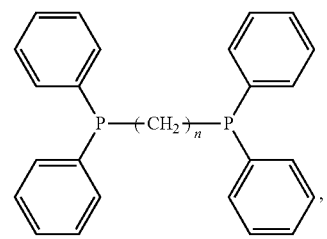

wherein n=1-20.

In certain embodiments, the bisphosphine nucleophiles may include one or more bisphosphine nucleophiles. Some examples of bisphosphine nucleophiles are 1,3-bis(diphenylphosphino)propane (DPPP), 1,4-bis(diphenylphosphino)butane (DPPB), 1,5-bis(diphenylphosphino)pentane, 1,6-bis(diphenyl-phosphino)hexane and 1,8-bis(diphenylphosphino)octane.

According to one aspect of the instant disclosure, the multi-functional phosphine compound can be reacted with the halo-containing polymer in an amount of about 2-160 mg of the multi-functional phosphine compound per 100 g of the halo-containing polymer. In certain embodiments, the multi-functional phosphine compound may be used in an amount ranging from about 10-108 mg per 100 g of the halo-containing polymer. In certain embodiments, the multi-functional phosphine compound may be used in an amount ranging from about 15-90 g per 100 g of the halo-containing polymer. In certain embodiments, the multi-functional phosphine compound may be used in an amount ranging from about 25-70 mg per 100 g of the halo-containing polymer. In certain embodiments, the multi-functional phosphine compound may be used in an amount ranging from about 30-66 mg per 100 g of the halo-containing polymer. In certain embodiments, the multi-functional phosphine compound may be used in an amount ranging from about 15-66 mg per 100 g of the halo-containing polymer.

In certain embodiments, the polymer composition comprises the reaction product of a bisphosphine compound with a bromo-containing polymer. In such an embodiment, the amount of a bisphosphine compound may be expressed in a molar ratio with respect to allyclic bromides on a bromo-containing polymer. In certain embodiments, the molar ratio of bisphosphine to bromo-containing polymer is in the range of 1:25 to 1:1,350. In certain embodiments, the molar ratio of bisphosphine to bromo-containing polymer is in the range of 1:35 to 1:650. In certain embodiments, the molar ratio of bisphosphine to bromo-containing polymer is in the range of 1:50 to 1:450. In certain embodiments, the molar ratio of bisphosphine to bromo-containing polymer is in the range of 1:60 to 1:350. In certain embodiments, the molar ratio of bisphosphine to bromo-containing polymer is in the range of 1:90 to 1:150.

According to an aspect of the present disclosure, the multi-functional phosphine compound is mixed with the halo-containing polymer and reacted. Mixing may be accomplished by any means apparent to those of skill in the art in view of this disclosure. Suitable mixing devices include, but are not limited to, Brabender type measuring mixers, Banbury mixers, twin-screw extruders and the like. In certain embodiments, the multi-functional phosphine compound may be mixed with a solvent prior to incorporating into the halo-containing polymer. In such an embodiment, once the multi-functional phosphine compound is mixed with a solvent, the solvent/multi-functional phosphine compound mixture is then incorporated into the halo-containing compound. In some embodiments, the solvent may be removed by stripping the solvent under heated conditions prior to reacting the multi-functional phosphine compound with the halo-containing polymer. In certain embodiments, the solvent can be stripped when heat is applied to effectuate the reaction. Once the multi-functional phosphine compound is mixed or dispersed into the halo-containing polymer, the reactants are reacted under heated conditions. In certain embodiments, the reactants are heated to a temperature in the range of about 140° to about 200° C. In certain embodiments, the reactants are heated to a temperature to a temperature of about 160° C. In certain embodiments, the multi-functional phosphine compound and the halo-containing polymer are reacted for about 1-90 minutes. In certain embodiments, the multi-functional phosphine compound and the halo-containing polymer are reacted for about 10-90 minutes. In certain embodiments, the multi-functional phosphine compound and the halo-containing polymer are reacted for about 15-60 minutes. In certain embodiments, the multi-functional phosphine compound and the halo-containing polymer are reacted for about 1-10 minutes.

In some embodiments, the high molecular weight polymer fraction may be present in the polymer composition in amounts of up to about 50% by weight based on the total weight of the polymer composition. In certain embodiments, the high molecular weight polymer fraction may be present in an amount ranging from about 2% to about 50%. In certain embodiments, the high molecular weight polymer fraction may be present in an amount ranging from about 5% to about 50%. In certain embodiments, the high molecular weight polymer fraction may be present in an amount ranging from about 5% to about 40%. In certain embodiments, the high molecular weight polymer fraction may be present in an amount ranging from about 10% to about 40%.

Reactions according to the instant disclosure form a polymer fraction having a branched multi-functional phosphine compound linkage. This branched linkage is derived from the multi-functional phosphine compound employed during the reaction, as disclosed herein. In certain embodiments, the multi-functional phosphine linkage comprises the following structure:

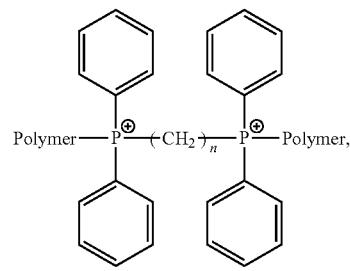

wherein n=1-20.

The multi-functional phosphine compound reacts with the polymer and connects polymer chains by creating a branch or bridge between the polymer chains where the branch or bridge comprises a linkage derived from the multi-functional phosphine compound. After the reaction, a composition is created having a mixture of polymer fractions having the multi-functional branching and a portion of unreacted halo-containing polymers. In certain embodiments, the polymer fraction comprises an ionic functionality.

Reaction I below illustrates an exemplary embodiment of a reaction between the multi-functional phosphine compound and a halo-containing polymer. In Scheme I, a bisphosphine is reacted with a halobutyl polymer at a temperature of between 160° and 180° C. to form a polymer fraction having ionic functionality.

Reaction I:

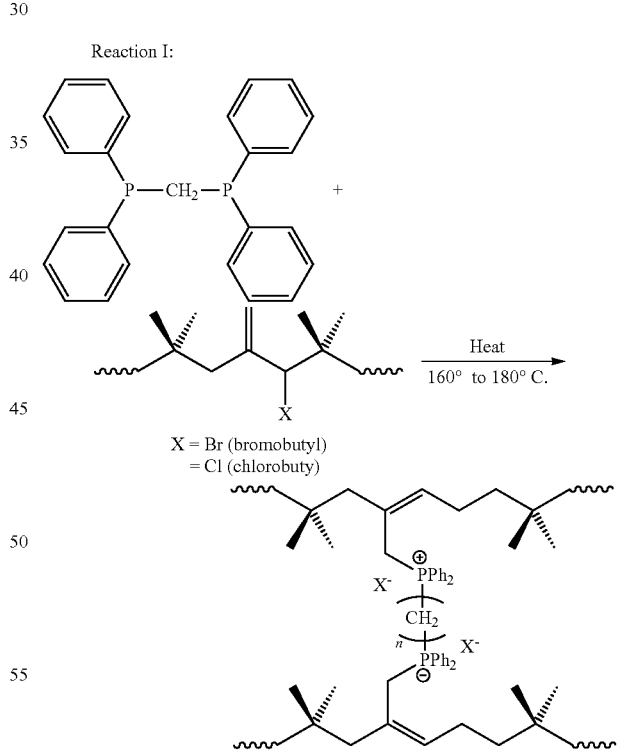

The reaction produces an uncured polymer composition since the amount of multi-functional phosphine compound employed in the reaction is insufficient to cure the halo-containing polymer. In certain embodiments, the levels of the multi-functional component represent less than about 10% of the halo sites available on the starting (unmodified) halo-containing polymer. The level of the multi-functional component may represent less than about 9%, or less than about 8%, or less than about 7%, or less than about 6% or less than about 5%, or less than about 4%, or less than about 3%, or less than about 2%, or less than about 1.9% or less than about 1.8%, or less than about 1.7%, or less than about 1.6%, or less than about 1.5%, or less than about 1.4%, or less than about 1.3%, or less than about 1.2%, or less than about 1.1%, or less than about 1%, or less than about 0.9%, or less than about 0.8% or less than about 0.7%, or less than about 0.6%, or less than about 0.5%, or less than about 0.4%, or less than about 0.3%, or less than about 0.2%, or less than about 0.1% of the available halo sites. Thus, the cure state of the polymer composition is not compromised during compounding.

In certain embodiments, the resultant polymer composition comprises a gel content of less than about 10%, based on total weight of the polymer composition. In certain embodiments, the gel content of the polymer composition is about 9% or less. In certain embodiments, the gel content of the polymer composition is about 5% or less. In certain embodiments, the gel content of the polymer composition is about 3% or less. In certain embodiments, the gel content of the polymer composition is about 2.5% or less. In certain embodiments, the gel content of the polymer composition is about 2% or less. In certain embodiments, the gel content of the polymer composition is about 1.5% or less. In certain embodiments, the gel content of the polymer composition is about 1% or less. In certain embodiments, the gel content of the polymer composition is about 0.5% or less.

Heat treatment of the halo-containing polymer, i.e., subjecting the polymer to heated conditions of 160° to 180° C., alone may have an impact on the microstructure of the halo-containing polymer. For example, in brominated butyl rubber, heat treatment produces an increase in re-arranged bromine of the brominated isoprene portion of the brominated butyl rubber and a decrease in the exo-structure. Further, in some instances, the amount of ESBO remaining may be decreased to about 0%. Generally, a less intense heat treatment results in a less amount of the re-arranged bromine. However, in addition to heating, reaction with the multi-functional phosphine compound has been found to increase the re-arranged product when compared to the heat treatment alone, indicating that the reaction of the multi-functional phosphine compound with the halo-containing compound enhances bromine re-arrangement at the disclosed temperature ranges.

It has been found that the resultant polymer composition made according to the instant disclosure possesses a multi-modal molecular weight distribution. In certain embodiments, the multi-modal molecular weight distribution is a bimodal molecular weight distribution. It is remarkable that the polymer composition may possess a multi-modal molecular weight distribution, in particular a bimodal molecular weight distribution, with a significant amount of a higher molecular weight fraction while not having a significant gel content.

It has been found that this multi-modal molecular weight distribution has an impact on the Mooney viscosity and the Mooney relaxation (T80) values. With regard to the Mooney viscosity, the polymer composition can have a change, in particular an increase, in the Mooney viscosity relative to the starting halo-containing polymer of about 1 to 30 MU (delta MU). In some embodiments, the delta MU can be from about 5 to about 30. In some embodiments, the delta MU can be from about 10 to about 30. The delta Mooney is related to the amount of multi-functional phosphine compound employed in the reaction to form the polymer composition. The delta Mooney is related to the amount of multi-functional phosphine compound by a non-linear relationship.

The resultant polymer composition has been found to have an increase in Mooney relaxation time (T80) over the starting halo-containing polymer. In certain embodiments, polymer composition having a Mooney relaxation time (T80) of under 5 seconds have been shown to correspond to T80=[0.4±0.1]×MU. This illustrates that for small increases in the Mooney viscosity of the polymer compositions, as small increase in Mooney relaxation time is realized. In embodiments where the polymer compositions have a Mooney relaxation time (T80) is over 5 seconds, the Mooney relaxation has been shown to correspond to T80=[1.4±0.1]×MU. This illustrates that above a 5 second increase in the Mooney relaxation time, the Mooney relaxation time increase substantially for every unit of increase in the Mooney viscosity. Thus, polymer compositions having higher percent amounts of the polymer fraction show an increase in the Mooney relaxation time.

The polymer compositions of the present disclosure have been shown to have increased processability and may be suitable in tire applications, such as inner liners, pharma stoppers, adhesives, belts, and the like. The polymer compositions disclosed herein can be used in similar applications as what would be expected with regard to the starting halo-containing polymer. Such applications would be apparent to those of skill in the art in view of this disclosure.

Although the present disclosure has been described in considerable detail with reference to certain embodiments thereof, other versions are possible. Therefore the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the disclosure in any manner.

EXAMPLES

Testing Procedures:

Mooney relaxation experiments (ML 1+8+8) at 125° C. were completed on an Monsanto MV2000 Mooney viscometer. RPA experiments were completed using an Alpha Technologies Rubber Process Analyzer RPA 2000.

Gel permeation Chromatography (GPC) analysis of the polymers was performed using a Waters e2695 GPC equipped with at a flow rate of 0.8 mL/min at 35° C. using solutions containing 4 mg/mL of polymer with 2 Jordi Polar Pax Wax MB LS columns (used for polar or ionic polymers) with 3% acetic acid in THF. Absolute molecular weights were determined using a Wyatt Dawn Helios II light-scattering detector and processed using the ASTRA 5 software package. The GPC was also equipped with a Wyatt Viscostar II viscometer, a Wyatt Optilab rEX refractive index detector and a Waters 2998 Photodiode Array Detector operating at 254 nm for UV detection.

$^1$H NMR's were run on a Bruker Avance III 500 MHz instrument using a 90° pulse, a 10 second relaxation delay and 100 scans. Sweep width was 10 ppm using 16K data points. Data was processed with an exponential multiplier of 0.3, sample concentration was 1-2 wt % in $CDCl_3$.

Sample Preparation of Samples 1-32:

All samples were prepared by first dispersing the bis-phosphine into the BB2030 via a 4×6 or 6×12 mill at 100° C. for less than 3 mins. The temperature was chosen for ease of processing and to limit any mechanical degradation of high molecular weight chains. The time was limited to minimize the oxidation of the phosphine prior to the reaction.

A C. W. Brabender Intelli-Torque Plasti-Corder with an 85 mL mixing head and cam mixer blades was used (samples 1-16) to determine the range of bis-phosphine required to increase the molecular weight of BB2030 but not form a substantial gel fraction (60 g sample, fill factor of 86%). A temperature of 160° C. and 60 rpm was chosen as the starting temperature for the reaction between triphenylphosphine (TPP) and BIIR. Torque curves were used illustrate that the reaction was indeed occurring, and to determine appropriate mixing time. Mixing was continued until the torque had stabilized for approx. 1 minute, as shown in FIG. 1.

A 1.5 L Banbury mixer (BR-82), utilizing 1.3 □kg (88% fill factor) of BB2030 per mix (samples 23-32). The start temperature was 80° C. and 70 rpm. The time and temperature of the mixing reactions are noted in Tables 1-3, below. There was improved temperature control using the BR-82 compared to the brabender through adjustment of the rpm during mixing, resulting in reaction temperatures that could be maintained at a steady 160° C. instead of increasing to 180° C. as done with the small head mixes.

A twin screw extruder (Thermo Electron Corporation Prism USALAB 16 Mini Extruder) was used (samples 17-22) at 160-180° C. and 25-50 rpm. These conditions resulted in a throughput of approx. 8.5 g/min, with a residence time of approx. 3 mins. Specific temperatures and rpm are listed in Tables 1-3.

Table 1 illustrates Mooney Viscosities, decay times, and % gel for the tested samples numbers 1-32.

TABLE 1

| Mixing type | sample # | mg/100 g | MU | 80% decay | Gel (%) |
|---|---|---|---|---|---|
| Brabender 160-180° C. | 1 | 0 | 32.2 | 4.16 | 3 |
| | 2 | 0 | 32.2 | 4.16 | 4 |
| | 3 | 37 | 39.1 | 11.96 | 3 |
| | 4 | 37 | 38.9 | 11.04 | 4 |
| | 5 | 45 | 43.3 | 17.28 | 5 |
| | 6 | 45 | 41.6 | 14.96 | 3 |
| | 7 | 55 | 46.3 | 20.64 | 3 |
| | 8 | 55 | 48.6 | 23.76 | 3 |
| | 9 | 66 | 57.1 | 38.08 | 3 |
| | 10 | 66 | 53 | 31.20 | 3 |
| | 11$^V$ | 28 | 36.6 | 9.16 | n.d. |
| | 12$^V$ | 42 | 41.9 | 15.84 | n.d. |
| | 13• | 55 | 46.5 | 21.00 | n.d. |
| | 14♦ | 55 | 40.5 | 13.12 | n.d. |
| | 15♥ | 55 | 45.2 | 19.32 | n.d. |
| | 16♣ | 55 | 48 | 22.76 | n.d. |
| Mill, 100° C. | 17 | 0 | 33.3 | 4.24 | 4 |
| | 18 | 55 | 41.2 | 10.32 | 6 |
| | 19 | 66 | 41.8 | 10.68 | 5 |
| 180° C., 50 rpm | 20 (avg of 8) | 55 | 50.6 | 27.32 | 1 |
| | std dev | | 1.3 | 1.8 | 1 |
| 160° C., 25 rpm | 21 (avg of 3) | 55 | 46.47 | 18.20 | 1 |
| | std dev | | 1.4 | 2.0 | 1 |
| 160 C., 50 rpm | 22 (avg of 3) | 55 | 46.80 | 19.35 | 1 |
| | std dev | | 0.2 | 0.2 | 2 |
| BR-82, (varied conditions, see below) | 23 | 50 | 45.6 | 16.56 | 5 |
| | 24 | 50 | 46.6 | 18.56 | 5 |
| | 25 | 50 | 43.3 | 15.48 | 5 |
| | 26 | 50 | 43.5 | 18.00 | 3 |
| | 27 | 0 | 32.2 | 4.24 | 5 |
| | 28 | 34 | 36.1 | 8.12 | 4 |
| | 29 | 34 | 39.1 | 8.96 | 5 |
| | 30 | 34 | 38.5 | 8.36 | 5 |

TABLE 1-continued

| Mixing type | sample # | mg/100 g | MU | 80% decay | Gel (%) |
|---|---|---|---|---|---|
| | 31 | 50 | 43.9 | 17.64 | 5 |
| | 32 | 50 | 48.3 | 20.68 | 5 |

1-16: Brabender; start temp = 160° C., end temp = 180° C., 5 min total
17-19: Milled for 1 hour at 100° C.
20, 21, 22: Extruder at 180° C., 50 rpm, 160 C. 25 rpm and 160° C. 50 rpm, respectively
23: BR 82, 80° C. start, up to 160° C. and hold for 2 min
24, 27, 29, 32: 80° C. start, up to 160° C. and hold for 4 min
25, 30: 80° C. start, up to 160° C. and hold for 6 min
26, 28, 31: 80° C. start, dump at 180° C., approx. 3.5 mins above 160° C.

•propane derivative, 54 mg/100 g BIIR; molar equiv. to 55 mg butane linker
♦hexane, derivative, 60 mg/100 g BIIR; molar equiv. to 55 mg butane linker
♥octane, derivative, 63 mg/100 g BIIR; molar equiv. to 55 mg butane linker
♣butane derivative, 55 mg/100 g BIIR
$^V$TPP added so the total ionic content of TPP and bisphosphine is equivalent is to 55 mg bis-phosphine/100 g BIIR; # 11 = 50% ionic content from TPP, #12 = 25% ionic content from TPP Table 2 illustrates GPC results for the tested samples 1-32. In testing the molecular weights, an ionomer column was employed to improve separation of the ionomeric polymers.

TABLE 2

| Mixing type | sample # | $M_n$ | $M_p$ | $M_w$ | $M_z$ | PDI |
|---|---|---|---|---|---|---|
| Brabender 160-180° C. | 1 | 196400 | 357100 | 530500 | 1061000 | 2.7 |
| | 2 | 199800 | 362300 | 525000 | 1034000 | 2.6 |
| | 3 | 248700 | 303500 | 854900 | 2274000 | 3.4 |
| | 4 | 249000 | 317800 | 818900 | 2173000 | 3.3 |
| | 5 | 242300 | 275900 | 910100 | 2541000 | 3.8 |
| | 6 | 249700 | 303700 | 887000 | 2490000 | 3.6 |
| | 7 | 267800 | 273500 | 1068000 | 3683000 | 4.0 |
| | 8 | 315400 | 286200 | 1257000 | 4764000 | 4.0 |
| | 9 | 365900 | 274800 | 1989000 | 13110000 | 5.4 |
| | 10 | 325100 | 271800 | 1450000 | 6939000 | 4.5 |
| | 11 | 234900 | 275600 | 760500 | 1804000 | 3.2 |
| | 12 | 282600 | 296200 | 978200 | 2797000 | 3.5 |
| | 13 | 338800 | 308800 | 1134000 | 3486000 | 3.3 |
| | 14 | 239100 | 302300 | 814000 | 2024000 | 3.4 |
| | 15 | 272500 | 262200 | 1090000 | 4370000 | 4.0 |
| | 16 | 260300 | 291600 | 1022000 | 3246000 | 3.9 |
| Mill, 100° C. | 17 | 211300 | 391800 | 528100 | 1031000 | 2.5 |
| | 18 | 253200 | 313200 | 837300 | 2061000 | 3.3 |
| | 19 | 234100 | 303600 | 776200 | 1881000 | 3.3 |
| 180° C., 50 rpm | 20 (avg of 8) | 426763 | 326213 | 1381375 | 4196125 | 3.2 |
| | std dev | 40540 | 14558 | 134300 | 666691 | 0.0 |
| 160 C., 25 rpm | 21 (avg of 3) | 297567 | 288200 | 1013233 | 2783667 | 3.41 |
| | std dev | 11021 | 4423 | 22176 | 128974 | 0.1 |
| 160° C., 50 rpm | 22 (avg of 3) | 309700 | 299233 | 1016167 | 3036000 | 3.28 |
| | std dev | 1375 | 12608 | 23528 | 143565 | 0.1 |
| BR-82, (varied conditions, see below) | 23 | 254200 | 290100 | 849100 | 2128000 | 3.3 |
| | 24 | 273300 | 294900 | 899700 | 2309000 | 3.3 |
| | 25 | 285000 | 310500 | 874200 | 2124000 | 3.1 |
| | 26 | 298700 | 287300 | 951200 | 2529000 | 3.2 |
| | 27 | 178300 | 361600 | 512700 | 1018000 | 2.9 |
| | 28 | 211100 | 289300 | 732100 | 1787000 | 3.5 |
| | 29 | 232400 | 303000 | 752700 | 1761000 | 3.2 |
| | 30 | 223500 | 300900 | 741300 | 1771000 | 3.3 |
| | 31 | 287200 | 296300 | 936700 | 2686000 | 3.3 |
| | 32 | 318600 | 312200 | 1047000 | 2997000 | 3.3 |

Table 3 illustrates H NMR analysis for the tested samples 1-32.

TABLE 3

| Mixing type | sample # | $CH_2$-X (Z) | exo-$CH_2$ (E) | trans endo X | sum Br | ESBO |
|---|---|---|---|---|---|---|
| Brabender 160-180° C. | 1 | 0.33 | 0.52 | 0.03 | 0.88 | |
| | 2 | | | | 0.00 | |
| | 3 | 0.51 | 0.29 | 0.03 | 0.83 | |
| | 4 | | | | 0.00 | |
| | 5 | | | | 0.00 | |
| | 6 | 0.52 | 0.28 | 0.02 | 0.82 | |
| | 7 | 0.55 | 0.21 | 0.03 | 0.79 | |
| | 8 | 0.54 | 0.24 | 0.03 | 0.81 | |
| | 9 | 0.55 | 0.23 | 0.03 | 0.81 | |
| | 10 | 0.57 | 0.21 | 0.03 | 0.81 | |
| | 11 | 0.56 | 0.24 | 0.03 | 0.83 | |
| | 12 | 0.56 | 0.21 | 0.01 | 0.78 | |
| | 13 | 0.55 | 0.2 | 0.03 | 0.78 | |
| | 14 | 0.46 | 0.37 | 0.03 | 0.86 | |
| | 15 | 0.50 | 0.3 | 0.02 | 0.82 | |
| | 16 | 0.53 | 0.27 | 0.03 | 0.83 | |
| Mill, 100° C. | 17 | 0.09 | 0.79 | 0.03 | 0.91 | |
| | 18 | 0.21 | 0.66 | 0.02 | 0.89 | |
| | 19 | | | | 0.00 | |
| 180° C., 50 rpm | 20 (avg of 8) | 0.52 | 0.29 | 0.02 | 0.83 | 3 |
| | std dev | 0.0 | 0.0 | 0.0 | 0.0 | 3 |
| 160 C., 25 rpm | 21 (avg of 3) | 0.39 | 0.47 | 0.04 | 0.90 | 14 |
| | std dev | 0.0 | 0.0 | 0.0 | 0.0 | 5 |
| 160° C., 50 rpm | 22 (avg of 3) | 0.35 | 0.51 | 0.04 | 0.90 | 12 |
| | std dev | 0.0 | 0.0 | 0.0 | 0.0 | 1.0 |
| BR-82, (varied conditions, see below) | 23 | 0.43 | 0.43 | 0.04 | 0.90 | 0 |
| | 24 | 0.48 | 0.38 | 0.04 | 0.90 | 0 |
| | 25 | 0.48 | 0.36 | 0.03 | 0.87 | 0 |
| | 26 | 0.51 | 0.31 | 0.03 | 0.85 | 0 |
| | 27 | 0.13 | 0.77 | 0.04 | 0.94 | 13 |
| | 28 | 0.45 | 0.37 | 0.02 | 0.84 | 6 |
| | 29 | 0.40 | 0.46 | 0.03 | 0.89 | 3 |
| | 30 | 0.43 | 0.42 | 0.03 | 0.88 | 1 |
| | 31 | 0.50 | 0.31 | 0.03 | 0.84 | 7 |
| | 32 | 0.47 | 0.37 | 0.03 | 0.87 | 0 |

Results and Discussion:

The reaction was completed using BB2030 in: 1) a small head brabender at 160-180° C. with a 60 g sample size, 2) a twin screw extruder at 160 and 180° C. and at 25 and 50 rpm, 3) a 4×6" mill at 100° C. for 1 hr, and 3) scaled up using the BR-82 1.5 L internal mixer at 160-180° C. The amount of the bis-phosphine was varied between 0-66 mg/100 g BIIR (0-0.066 phr). These levels of bis-phosphine represent <2% of the bromine sites available, and would not impact the cure state of the polymer during compounding.

In comparison, heat treatment alone is shown to impact the microstructure of the brominated isoprene. As seen in Tables 1-3, the heat treatment produces an increase in re-arranged Br and a decrease in the exo-structure. In addition, the amount of ESBO remaining decreased down to 0% in most cases. In general, the less intense the heat treatment, the lower the fraction of rearranged Br. However, the instant process is shown to increase the amount of rearranged product for any of the tested samples when compared to simply heat treating BIIR. This indicates that the bis-phosphine enhances the rearrangement reaction in the tested temperature range. This is illustrated in the examples where samples heat treated without bis-phosphine versus those that do contain bis-phosphine under similar conditions, i.e., #1 and #2 vs. #3-#10 made in the brabender, or sample #27 versus #23-#26 made in the BR-82.

Figure 2:
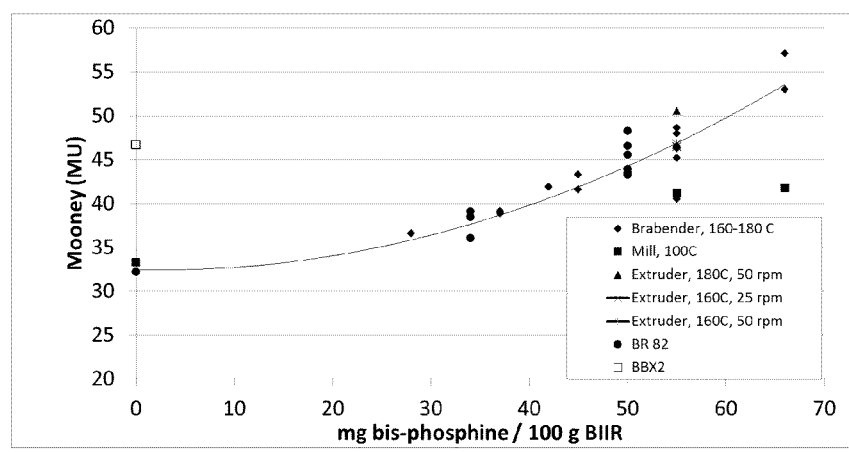
FIG. 2 illustrates the relation of bis-phosphine content and Mooney units according to certain embodiments.
Figure 3:
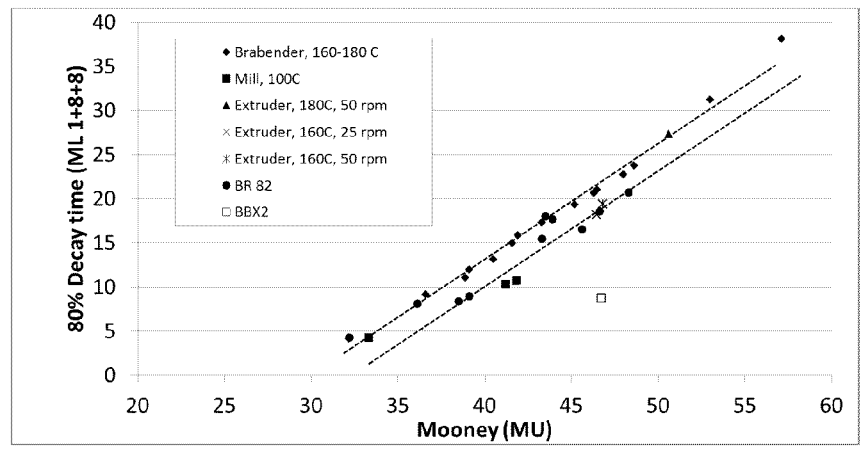
FIG. 3 illustrates the Mooney units with respect to 80% decay time for certain embodiments.

The resulting Mooney viscosities and 80% decay are also illustrated in Tables 1-3 and FIG. 2 and FIG. 3. In general the Mooney viscosities follow the same trend line, with some variation based on the time and temperature used for the reaction.

The Mooney relaxation, 80% decay, times all fell on two straight lines as a function of Mooney viscosity, but were independent of mixing type, small mixer versus large mixer versus extruder, as shown in FIG. 3. The two lines result from the different heat treatment for the BIIR during the reaction. The samples that reached temperatures of 180° C. during mixing had a lower amount of bound bromine as determined by $^1$H NMR, as illustrated in Table 3. Samples maintained at temperatures at or below 160° C. retained a higher level of bound bromine as determined by H NMR, further illustrated in Table 3. Regardless of the heat treatment, the tested Samples according to the instant disclosure all resulted in significantly longer decay times at similar Mooney's compared to BBX2 (MU=47). On the other hand, a lower Mooney alternative (BBX2 at 36-39 MU) with a 80% decay, and thus, similar cold flow could be produced.

Figure 4:
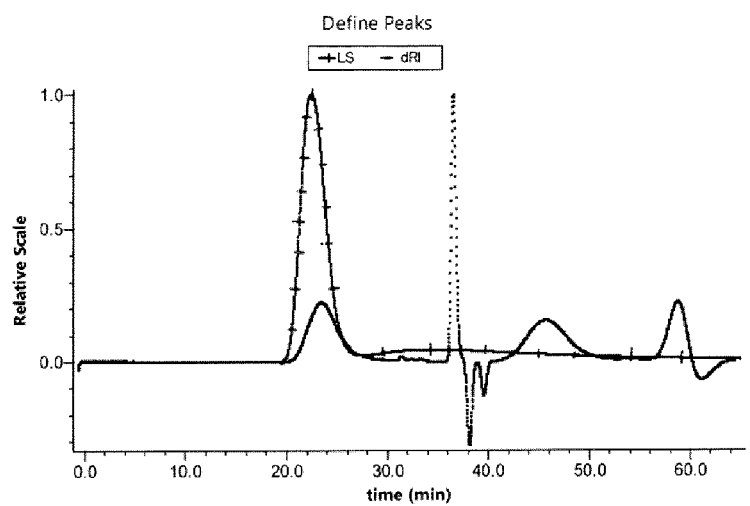
FIG. 4 illustrates GPC traces for certain embodiments using dRI and light scattering detectors after separation using a standard GPC column.
Figure 5:
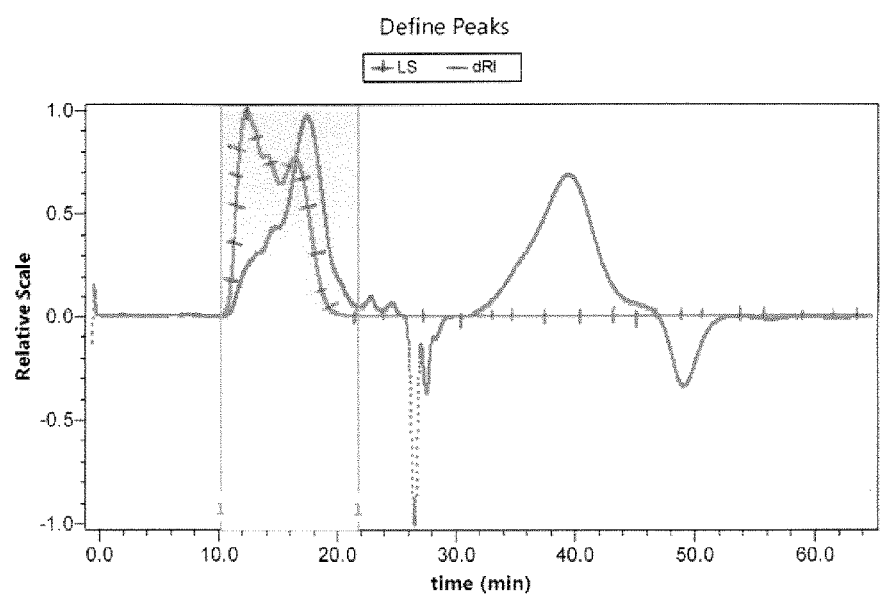
FIG. 5 illustrates GPC traces for certain embodiments using dRI and light scattering detectors after separation using a column designed for ionic polymers.
Figure 6:
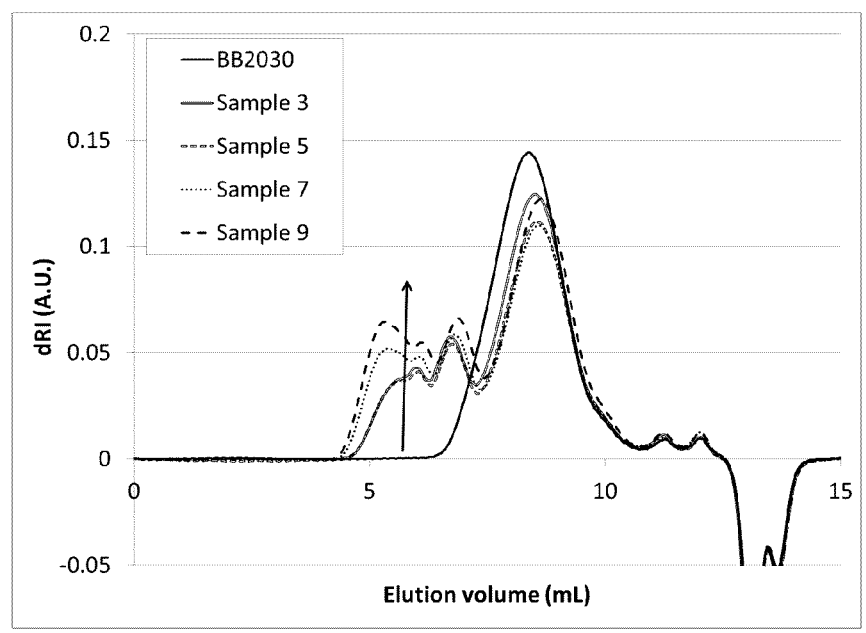
FIG. 6 illustrates GPC traces for certain embodiments using dRI detector after separation using a column designed for ionic polymers.
Figure 7:
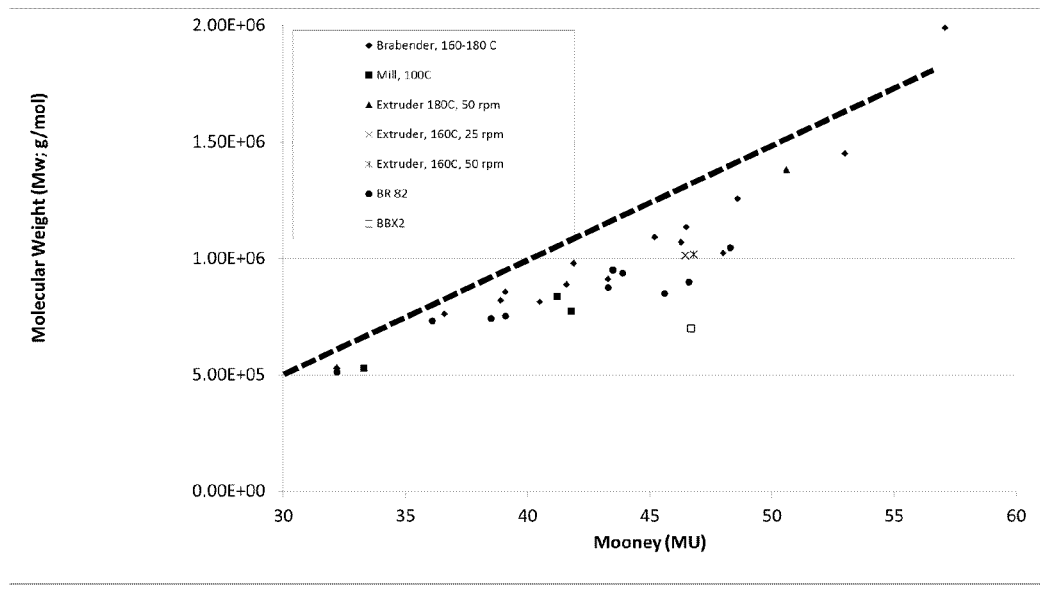
FIG. 7 illustrates molecular weight as a function of Mooney viscosity for certain embodiments.

GPC measurements were also completed on the tested samples. A special column was required for GPC measurements due to the ionic nature of the branching from the bis-phosphine. FIG. 4 and FIG. 5 show a comparison of the molecular weight distribution using the standard column compared one designed to screen out the effects of ionic species bound to the polymer. Separation using the standard column results in a monomodal peak, with a long tail observed in the light scattering trace. On the other hand, the ionomer specific column shows a multimodal peak, with good separation of high and low molecular weight chains. GPC traces using this ionomer column are shown for samples with a range of bisphosphine contents is shown in FIG. 6. The increased bis-phosphine results in an increased proportion of high molecular weight species. The Mp of the new peaks (see arrows in FIG. 6) increase by a factor of 2x, illustrating the control of the reaction and the reproducibility between different grades of BIIR. Further, the low molecular weight side of the BB2030 distribution remains constant, showing that the high molecular weight chains are reacted preferentially. FIG. 7 illustrates the correlation between Mw and the Mooney viscosity for the tested samples.

Figure 8A:
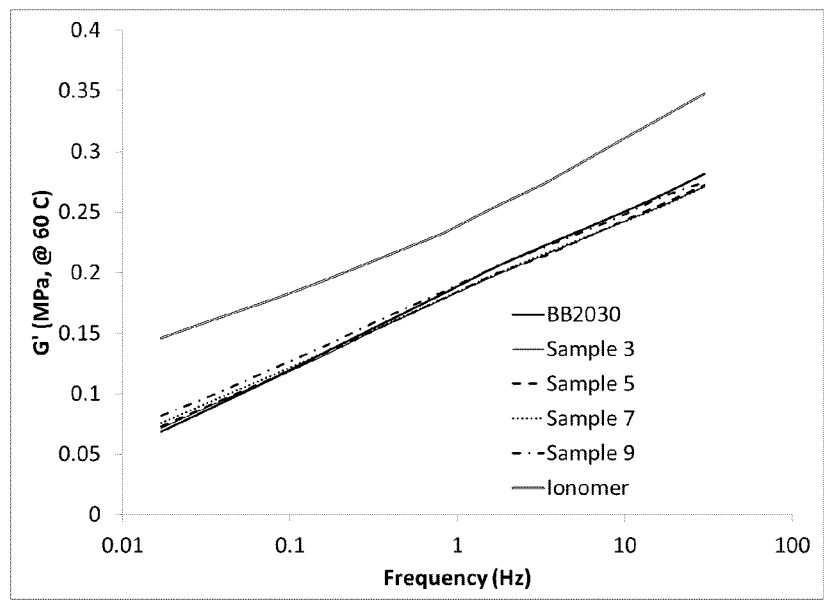
FIG. 8A illustrates elastic modulus as a function of frequency at 60° C. using an RPA for certain embodiments.
Figure 8B:
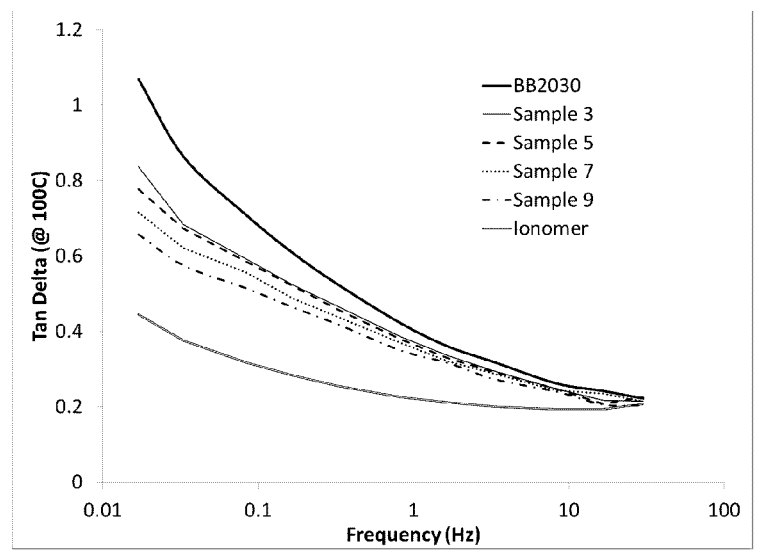
FIG. 8B illustrates tan delta as a function of frequency at 100° C. using an RPA for certain embodiments.

RPA measurements were conducted samples with the elastic modulus (G') at 60° C. and tan delta at 100° C. shown in FIG. 8A and FIG. 8B. The temperatures were chosen in order to compare the properties to an ionomer reference sample with 0.4 mol % bound triphenylphosphine. The measurement at 60° C. illustrates that the addition of bis-phosphine in this range has little impact on the elastic modulus in this range compared to BB2030, and that the low ionic content results in significantly less elastic character than the ionomer sample. Tan delta at 100° C. is used to illustrate the predicted processing of the rubber. A lower tan delta on the left hand side of the graph indicates less cold flow, while a higher tan delta on the right hand side of the graph indicates ease of processing. The RPA measurements indicate an influence on the polymer composition properties from the branched, high molecular weight of the Mooney-jumped samples, but little influence of the ionic groups used for the branching.

Table 4-6—Samples 33-59.

TABLE 4

| Mixing type, BIIR | sample # | mg/100 g | MU | 80% decay | Gel (%) |
|---|---|---|---|---|---|
| BR82, BB2030 | 33 | 50 | 45.6 | 16.56 | 5 |
|  | 34 | 50 | 46.6 | 18.56 | 5 |
|  | 35 | 34 | 39.1 | 8.96 | 5 |
| Extruder, 160 C., 50 rpm, BB2030 | 36 | 55 | 47.0 | 19.60 | 0.32 |
|  | 37 | 55 | 46.7 | 19.32 | 2.93 |
|  | 38 | 55 | 46.7 | 19.12 | −2.58 |
|  | 39 | 5 | 32.8 | 4.36 | n.d. |
|  | 40 | 10 | 33.9 | 4.60 | n.d. |
|  | 41 | 15 | 34.8 | 4.84 | n.d. |
|  | 42 | 20 | 35.5 | 5.2 | n.d. |
| Extruder, 160 C., 50 rpm, 26 MU base | 43 | 0 | 25.9 | 3.28 | n.d. |
|  | 44 | 15 | 28.2 | 3.17 | n.d. |
|  | 45 | 25 | 29 | 3.33 | n.d. |
|  | 46 | 35 | 30.7 | 3.76 | n.d. |
|  | 47 | 42 | 30.5 | 4.07 | n.d. |
|  | 48 | 50 | 32.5 | 4.72 | n.d. |
|  | 49 | 70 | 36.3 | 8.88 | n.d. |
|  | 50 | 100 | 53.8 | 33.64 | n.d. |
| Extruder, 160 C., 50 rpm, 22 MU base | 51 | 0 | 22.9 | 2.56 | n.d. |
|  | 52 | 30 | 23.2 | 2.64 | n.d. |
|  | 53 | 40 | 23.5 | 2.67 | n.d. |
|  | 54 | 50 | 24.5 | 2.95 | n.d. |
|  | 55 | 90 | 25.9 | 3.52 | 3.44 |
|  | 56 | 108 | 28.4 | 4.8 | 3.92 |
|  | 57 | 125 | 30.7 | 6.12 | <5 |
|  | 58 | 160 | 41.2 | 21.25 | 1.94 |
|  | 59 | 205 | 57.0 | 42.56 | 26.93 |

1: 80° C. start, up to 160° C. and hold for 2 min
2, 3: 80° C. start, up to 160° C. and hold for 4 min

TABLE 5

| Mixing type, BIIR | sample # | $M_n$ | $M_p$ | $M_w$ | $M_z$ | PDI (Mw/Mn) | Mz/Mw | % HMWF |
|---|---|---|---|---|---|---|---|---|
| BR82, BB2030 | 33 | 254200 | 290100 | 849100 | 2128000 | 3.3 | 2.5 |  |
|  | 34 | 273300 | 294900 | 899700 | 2309000 | 3.3 | 2.6 | 18.0 |
|  | 35 | 232400 | 303000 | 752700 | 1761000 | 3.2 | 2.3 | 22.0 |
| Extruder, 160 C., 50 rpm, BB2030 | 36 | 308500 | 298700 | 989500 | 2895000 | 3.2 | 2.9 | 37.0 |
|  | 37 | 309400 | 312100 | 1025000 | 3182000 | 3.3 | 3.1 | 37.0 |
|  | 38 | 311200 | 286900 | 1034000 | 3031000 | 3.3 | 2.9 | 37.0 |
|  | 39 | 175700 | 350400 | 495900 | 940400 | 2.8 | 1.9 | 2.3 |
|  | 40 | 188400 | 341400 | 535000 | 975800 | 2.8 | 1.8 | 7.3 |
|  | 41 | 192300 | 327800 | 570300 | 1094000 | 3.0 | 1.9 | 11.5 |
|  | 42 | 196000 | 337600 | 597100 | 1169000 | 3.0 | 2.0 | 15 |
| Extruder, 160 C., 50 rpm, 26 MU base | 43 | 141900 | 341400 | 403300 | 688300 | 2.8 | 1.7 | 0.0 |
|  | 44 | 143800 | 329700 | 429200 | 690700 | 3.0 | 1.6 | 6.7 |
|  | 45 | 169300 | 327900 | 474700 | 851200 | 2.8 | 1.8 | 12.0 |
|  | 46 | 186900 | 305300 | 543600 | 1104000 | 2.9 | 2.0 | 19.9 |
|  | 47 | 180500 | 302900 | 562200 | 1125000 | 3.1 | 2.0 | 22.0 |
|  | 48 | 179500 | 282400 | 654600 | 1552000 | 3.6 | 2.4 | 29.0 |
|  | 49 | 202000 | 264100 | 761600 | 2087000 | 3.8 | 2.7 | 35.0 |
|  | 50 | 328500 | 250100 | 1429000 | 5647000 | 4.4 | 4.0 | 46.0 |
| Extruder, 160 C., 50 rpm, 22 MU base | 51 | 142700 | 304200 | 336600 | 536100 | 2.4 | 1.6 | 0 |
|  | 52 | 123200 | 258900 | 353400 | 580700 | 2.9 | 1.6 | 10.0 |
|  | 53 | 145300 | 264300 | 385400 | 664900 | 2.7 | 1.7 | 14.0 |
|  | 54 | 138700 | 250600 | 420400 | 809100 | 3.0 | 1.9 | 19.5 |
|  | 55 | 184500 | 217300 | 594600 | 1596000 | 3.2 | 2.7 | 32.0 |
|  | 56 | 187000 | 203300 | 707500 | 2157000 | 3.8 | 3.0 | 37.0 |
|  | 57 | 221300 | 204300 | 747200 | 2000000 | 3.4 | 2.7 | 40.0 |
|  | 58 | 322600 | 216600 | 1203000 | 5095000 | 3.7 | 4.2 | 48.0 |
|  | 59 |  | not run |  |  |  |  |  |

TABLE 6

| Mixing type, BIIR | sample # | CH$_2$-X (Z) | exo-CH$_2$ (E) | trans endo X | sum Br | ESBO |
|---|---|---|---|---|---|---|
| BR82, BB2030 | 33 | 0.43 | 0.43 | 0.04 | 0.90 | 0 |
| | 34 | 0.48 | 0.38 | 0.04 | 0.90 | 0 |
| | 35 | 0.40 | 0.46 | 0.03 | 0.89 | 3 |
| Extruder, 160 C., 50 rpm, BB2030 | 36 | 0.34 | 0.52 | 0.04 | 0.90 | 13 |
| | 37 | 0.35 | 0.51 | 0.04 | 0.90 | 11 |
| | 38 | 0.36 | 0.50 | 0.04 | 0.90 | 12 |
| | 39 | 0.1 | 0.75 | 0.05 | 0.90 | 15 |
| | 40 | 0.12 | 0.74 | 0.05 | 0.91 | 21 |
| | 41 | 0.15 | 0.72 | 0.05 | 0.92 | 25 |
| | 42 | 0.17 | 0.69 | 0.05 | 0.91 | 27 |
| Extruder, 160 C., 50 rpm, 26 MU base | 43 | 0.06 | 0.77 | 0.07 | 0.90 | 80 |
| | 44 | 0.15 | 0.68 | 0.03 | 0.86 | 55 |
| | 45 | 0.19 | 0.64 | 0.03 | 0.86 | 55 |
| | 46 | 0.22 | 0.6 | 0.03 | 0.85 | 52 |
| | 47 | 0.23 | 0.59 | 0.05 | 0.87 | 43 |
| | 48 | 0.32 | 0.49 | 0.04 | 0.85 | 40 |
| | 49 | 0.31 | 0.50 | 0.06 | 0.87 | 48 |
| | 50 | 0.41 | 0.39 | 0.05 | 0.85 | 36 |
| Extruder, 160 C., 50 rpm, 22 MU base | 51 | 0.35 | 0.43 | 0.03 | 0.81 | 39 |
| | 52 | 0.40 | 0.39 | 0.03 | 0.82 | 22 |
| | 53 | 0.40 | 0.37 | 0.02 | 0.79 | 21 |
| | 54 | 0.42 | 0.36 | 0.03 | 0.81 | 17 |
| | 55 | 0.46 | 0.33 | 0.05 | 0.84 | 0 |
| | 56 | 0.46 | 0.31 | 0.05 | 0.82 | 0 |
| | 57 | 0.48 | 0.27 | 0.05 | 0.80 | 0 |
| | 58 | 0.46 | 0.24 | 0.06 | 0.76 | 0 |
| | 59 | 0.53 | 0.20 | 0.04 | 0.77 | 0 |

Samples 33-59 represent polymer compositions based on three different base BIIR's, i.e., BB2030 and Brominated RB 402, having Mooney viscosities of 22, 26, and 32 MU where the resultant polymer compositions had Mooney viscosities of up to 50 MU and low gel content. All samples were prepared by first dispersing bis-phosphine into the BUR via a 4×6 or 6×12 mill at 100° C. for less than 3 mins.

Some of the BB2030 based samples were produced using a 1.5 L Banbury mixer (BR-82), utilizing 1.3 kg (88% fill factor) of BB2030 per mix (samples 1-3). The start temperature was 80° C. and 70 rpm.

The majority of samples produced used a twin screw extruder (Thermo Electron Corporation Prism USALAB 16 Mini Extruder) (samples 4-27) at 160° C. and 50 rpm. These conditions resulted in a throughput of approx. 8.5 g/min, with a residence time of approx. 3 mins.

Figure 9:
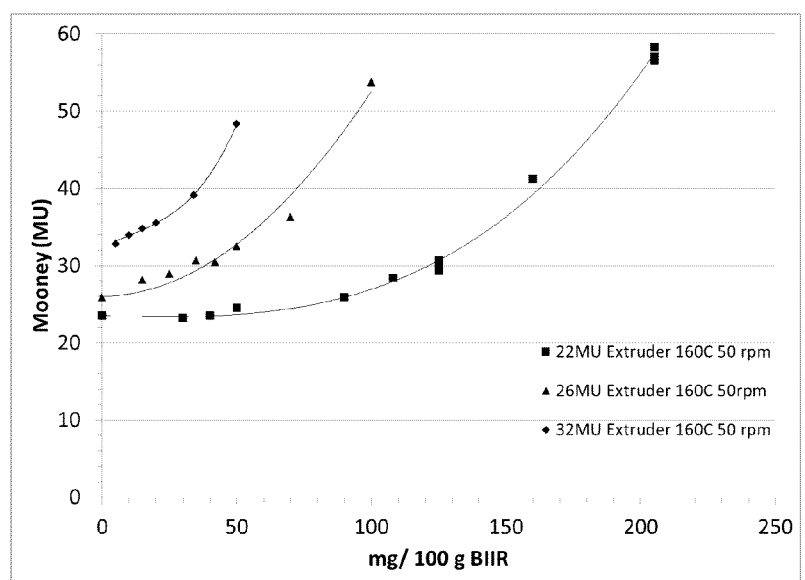
FIG. 9 illustrates Mooney viscosity as a function of bis-phosphine content per 100 g BIIR for certain embodiments.

In all three cases, there is a slow increase in the MU with added bis-phosphine, followed by a more rapid increase at higher additions. As can be seen in FIG. 9, increasing amounts of bis-phosphine were required to cause a significant increase in the Mooney as the MU of the base BIIR decreased, with the 22 MU base BIIR requiring >100 mg/100 g BIIR before a notable increase in the Mooney.

Figure 10:
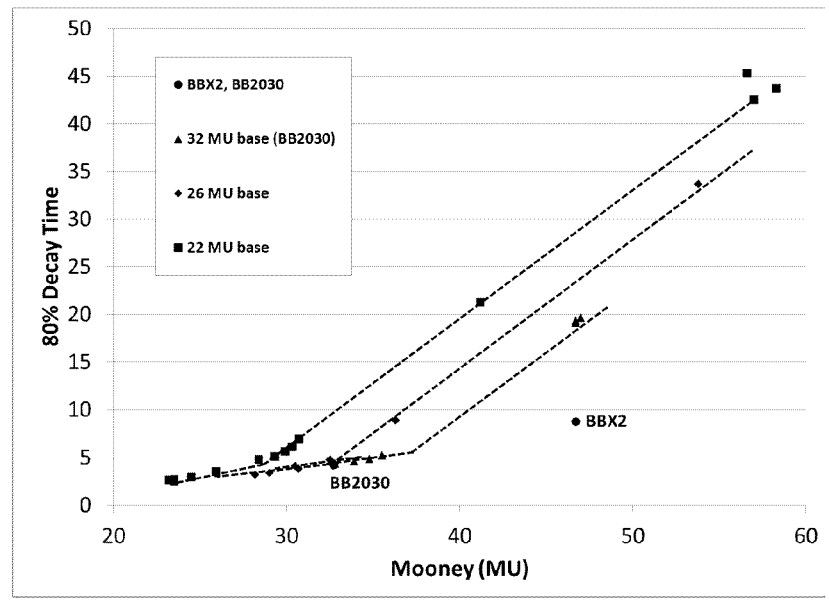
FIG. 10 illustrates Mooney relaxation (80% decay) as a function of Mooney viscosity for certain embodiments.

The viscoelastic properties, as measured by the Mooney Relaxation 80% decay, clearly demonstrates two different regimes with respect to the increase in Mooney and its impact on the 80% decay. This is illustrated in FIG. 10. In the first regime, the Mooney increased approximately 4-5 units with only a relatively small increase in decay time. The second regime showed a much more substantial increase in decay time for every point MU increase. The trend was the same in all three base MU materials. For the lower slope regime, the T80=[0.4±0.1]×MU, while the steeper sloped regime at higher bis-phosphine loadings followed T80=[1.4±0.1]×MU. Samples illustrating small increases in decay time would be appropriate for inner liner compounds in tire applications where improved processing and green strength would be beneficial. Samples illustrating the longer decay times would be ideal for pelletized BIIR.

Figure 11:
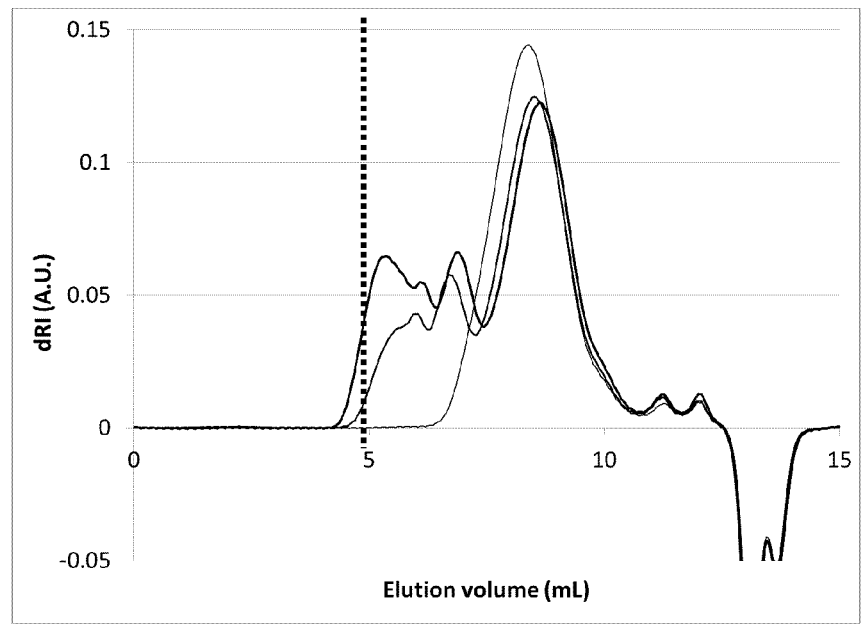
FIG. 11 illustrates GPC traces using dRI detector after separation using a column designed for ionic polymers for certain embodiments.
Figure 12:
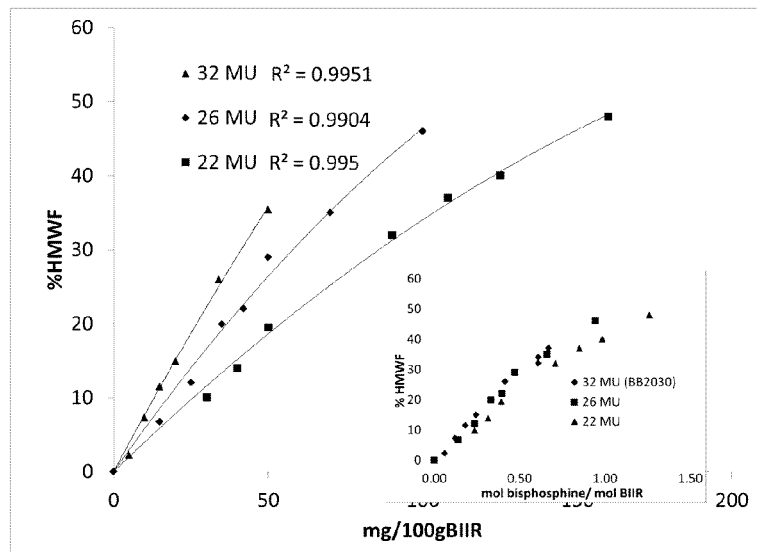
FIG. 12 illustrates percent polymer fraction as a function of bis-phosphine content per 100 g BIIR for certain embodiments.

For each of the samples, molecular weight and molecular weight distribution was determined by GPC. FIG. 11 shows a typical multimodal GPC trace, where a high molecular weight fraction (HMWF), i.e., polymer fraction, has been formed through the reaction with bis-phosphine. The percent HMWF has been calculated and is shown in Table 5 and FIGS. 12 and 13. FIG. 12 illustrates the percent HMWF as a function of bis-phosphine added. The percent HMWF is shown to increase steadily with amount of bis-phosphine added. The inset in FIG. 12 illustrates that the percent HMWF for all three series overlaps as a function of added bis-phosphine when the series is normalized to moles bis-phosphine per moles of chains of BIIR, showing a consistency of the bis-phosphine-Br reaction between different grades and different samples.

Figure 13:
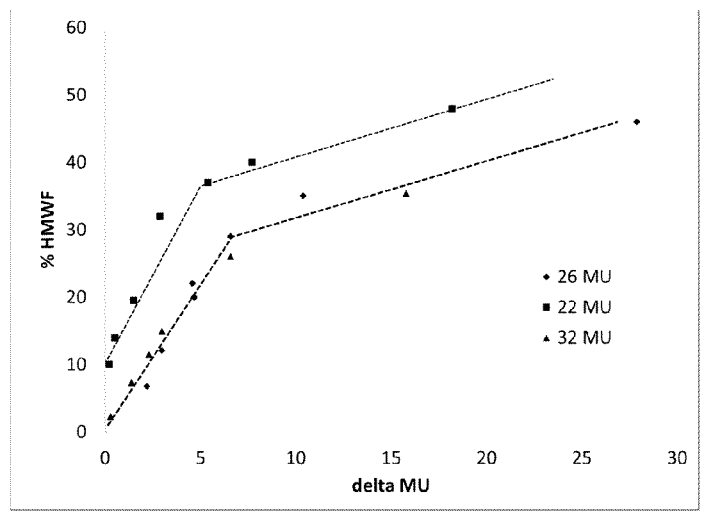
FIG. 13 illustrates percent polymer fraction as a function of the change in Mooney units for certain embodiments.

FIG. 13 illustrates the relationship between the percent HMWF and the change in MU observed after the reaction. For all three series, the percent HMWF increases at a relatively steep rate compared to the increasing in MU, whereas after 30% HMWF, the MU increases much faster for every small increase in HMWF. A transition appears to occur at an increase of approximately 4-7 MU, where the 80% decay times switch regimes.

Figure 14:
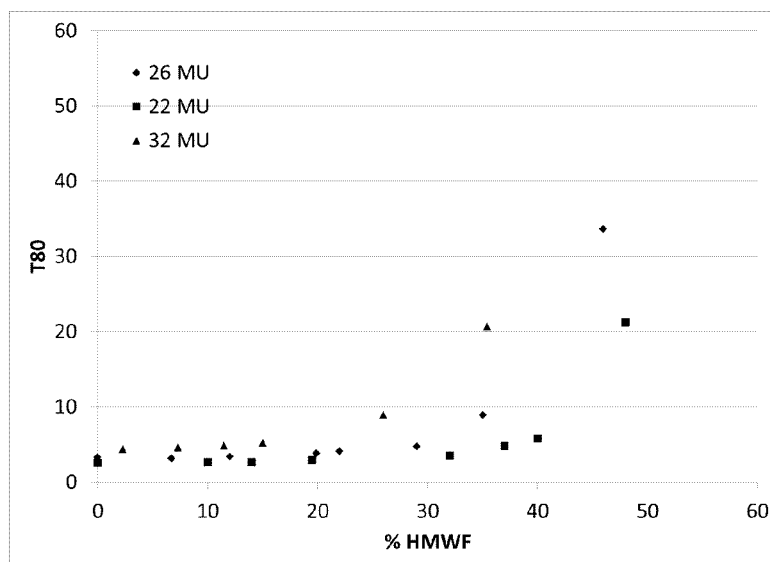
FIG. 14 illustrates Mooney relaxation (80% decay) as a function of polymer fraction for certain embodiments.

Finally, this transition can also be observed in FIG. 14, with Mooney Relaxation as a function of percent HMWF, where the decay time is nearly constant until the percent HMWF reaches 30-35%, after which the decay time begins to increase substantially with increasing percent HMWF. It should be noted that the increase in 80% decay time begins its increase in the order 32<26<22 in terms of percent HMWF. The samples show that polymer compositions possessing various handling properties can be produced by selectively choosing the base BIIR and the target percent polymer fraction or HMWF.

The foregoing samples illustrate that different Mooney viscosity bromobutyls can be used to create multi-modal bromobutyl polymers with improved processability and viscoelastic properties.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A polymer composition comprising a multi-model molecular weight distribution of a halo-containing polymer, the halo-containing polymer having multi-functional phosphine linkages at less than 10% of halo sites of the halo-containing polymer that were available before multi-functional phosphine linking.

2. The polymer composition according to claim 1, wherein the halo-containing polymer comprises a chlorinated or brominated butyl rubber polymer.

3. The polymer composition according to claim 1, wherein the multi-functional phosphine linkages are at less than 2% of the halo sites.

4. The polymer composition according to claim 1, wherein the multi-modal molecular weight distribution is a bimodal molecular weight distribution.

5. The polymer composition according to claim 1, wherein the multifunctional phosphine linkages are in a polymer fraction having a higher molecular weight than other fractions of the polymer composition, the higher molecular weight fraction being present in the polymer composition in an amount of up to 50% or less by weight based on the total weight of the polymer composition.

6. The polymer composition according to claim 5, wherein the amount of the higher molecular weight fraction is 2% to 50% by weight.

7. The polymer composition according to claim 1, wherein the polymer composition comprises a gel content of less than 10% or a gel content of 3% or less.

8. The polymer composition according to claim 1 having an increase in Mooney viscosity of about 5 to 30 MU relative to the Mooney viscosity before the multi-functional phosphine linking.

9. The polymer composition according to claim 1, wherein the multifunctional phosphine linkage is a bifunctional phosphine linkage.

10. The polymer composition according to claim 1, wherein the multifunctional phosphine linkage is derived from a compound of the following structure:

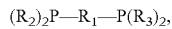

wherein

R$_1$, R$_2$, and R$_3$ are the same or different and are alkyl, alkenyl, cycloalkyl, aryl, heteroaryl, heteroalkyl, heteroalkenyl or heterocycloalkyl.

11. A process for producing a polymer composition having a multi-modal molecular weight distribution, the process comprising:

dispersing a multi-functional phosphine compound in a halo-containing polymer, the halo-containing polymer comprising a total number of available halo sites; and reacting the multi-functional phosphine compound with the halo-containing polymer at an elevated temperature to produce a polymer composition in which less than 10% of the total number of available halo sites are reacted with the phosphine compound to provide multifunctional phosphine linkages in the halo-containing compound.

12. The process according to claim 11, wherein the halo-containing polymer comprises repeating units derived from an isoolefin monomer and repeating units derived from one or more of a multiolefin monomer and a styrenic monomer, and wherein the polymer composition comprises a polymer fraction with branched multi-functional phosphine linkages.

13. The process according to claim 11, wherein the halo-containing polymer comprises a chlorinated or brominated butyl rubber polymer.

14. The process according to claim 11, wherein the temperature is 160° C. to 180° C.

15. The process according to claim 11, further comprising dispersing the multi-functional phosphine compound in a solvent prior to dispersing of the multi-functional phosphine with the halo-containing polymer.

16. The process according to claim 15, further comprising stripping the solvent from the multi-functional phosphine compound and halo-containing polymer mixture.

17. The process according to claim 11, wherein the multi-functional phosphine compound comprises a bis-phosphine compound.

18. The process according to claim 11, wherein the mufti-functional phosphine compound comprises a compound of the following structure:

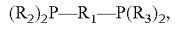

wherein

R$_1$, R$_2$, and R$_3$ are the same or different and are alkyl, alkenyl, cycloalkyl, aryl, heteroaryl, heteroalkyl, heteroalkenyl or heterocycloalkyl.

19. The process according to claim 11, wherein the multi-functional phosphine compound is used in an amount of about 25-70 mg per 100 g of the halo-containing polymer.

* * * * *

UNITED STATES PATENT AND TRADEMARK OFFICE
CERTIFICATE OF CORRECTION

PATENT NO. : 10,781,301 B2
APPLICATION NO. : 16/093704
DATED : September 22, 2020
INVENTOR(S) : Ingratta et al.

It is certified that error appears in the above-identified patent and that said Letters Patent is hereby corrected as shown below:

In the Claims

Column 19 Line 2, delete "molecular weight traction" and insert --molecular weight fraction--

Signed and Sealed this
Twenty-seventh Day of October, 2020

Andrei Iancu
*Director of the United States Patent and Trademark Office*